No. 790,697. PATENTED MAY 23, 1905.
A. W. MASON.
MOLD FOR PLASTIC MATERIALS.
APPLICATION FILED FEB. 16, 1905.
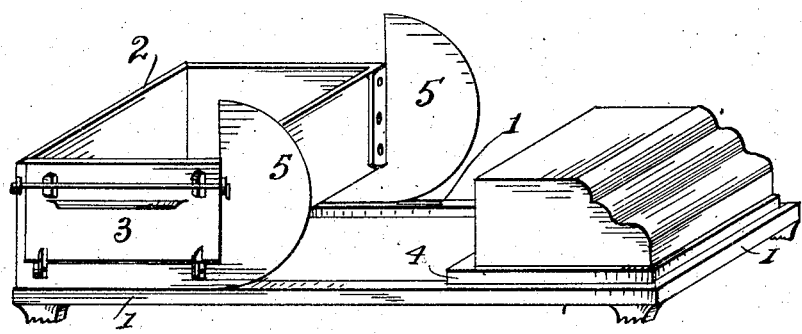
Witnesses
Edward R. Monroe.
A. C. Denison.
Inventor
Arthur W. Mason
by Edward Taggart
Attorney No. 790,697. Patented May 23, 1905.

UNITED STATES PATENT OFFICE.

ARTHUR W. MASON, OF JACKSON, MICHIGAN.

MOLD FOR PLASTIC MATERIALS.

SPECIFICATION forming part of Letters Patent No. 790,697, dated May 23, 1905.

Application filed February 16, 1905. Serial No. 245,929.

*To all whom it may concern:*

Be it known that I, ARTHUR W. MASON, a citizen of the United States, residing at Jackson, in the county of Jackson and State of Michigan, have invented new and useful Improvements in Molds for Plastic Materials, of which the following is a specification.

My invention relates more especially to molds designed for forming building-blocks or other articles out of cement and concrete; but it may be used also in connection with molds for plastic materials of any kind; and its object is to provide for the reversal of the mold easily and quickly and without jar, so that the contents may be satisfactorily removed. This object I accomplish by the means shown in the accompanying drawing, which shows the mold and the block thereby formed after the latter has been removed from the form.

In the drawing the numeral 1 represents the platform or frame upon which the mold rests. This may be of any suitable form and construction.

2 is the mold-box itself, provided in the form I have shown with the hinged end door 3 to facilitate the separation between the mold and its contained block. This mold also may be of any common form and construction suitable to receive the plastic material placed therein.

4 represents the top plate or cover of the mold when it contains the block.

I provide each end of the mold with an extension plate or arm, which I call a "rocker" and which are shown in the drawing by 5 5. I have shown these rockers formed integrally with the ends of the mold; but they may be formed or used in connection with any two opposite sides of the mold and attached thereto or held in relation therewith by any common means. I have shown two of these rockers; but it is obvious that one of them, appropriately situated, would serve the purpose, although I think not as efficiently as two. These rockers are so constructed and placed that they will turn or revolve upon the platform or frame which supports the mold, and the outer edges of these rockers are made of substantially the curved form shown, being the arc of a circle or any other curve which will permit the desired motion. In the form I have shown also these rocker-arms extend above the mold-box just far enough so that their upper extremities will be flush with the top of the top plate 4 when the latter is in position. The object to be accomplished by this point of construction is only that when the mold-box is reversed by rocking upon these rocker-arms they will deliver the top of the top plate, which when the mold is thereby reversed becomes the bottom, immediately and without fall or jar upon an appropriate receiving frame or platform, which may be a portion of the main frame 1, as shown in the drawing, or which may be specially constructed therefor.

The operation of my invention is as follows: The mold-box being in the position shown upon the left in the drawing, I fill the same with cement or concrete or other plastic material, and I then tamp the same as much as may be desirable. I then place the top plate 4 in position upon the top of the mold-box, holding the same in position, if desired, by any suitable locking means. I then rock or roll the mold-box over upon the outer curves of the rockers 5 5, so that it rests upon the right-hand portion of the frame, the top plate 4 being in contact with the frame and the mold-box being bottom side up as compared with its previous position. Either before or after this reversing operation I apply such pressure, if any, as may be desired to mold a perfect block of the proper consistency. This pressure may be applied by any means in common use for that purpose, and I therefore have not shown such means. I then remove any connection there may be between the mold-box and the top plate 4, open the hinged end 3, if it is desired to do so, and by sliding or lifting or rocking or by a combination of these motions remove the mold-box from the contained block. The box then rocks back to its original position and all the parts assume the position shown in the drawing.

If desired, interchangeable top plates 4 may be provided, and after the block is produced it may remain upon this top plate and be carried away to stand for such setting as may be necessary, and another top plate is used to construct the next block. The process of construction may thus be substantially continuous.

Having thus described my invention, what I claim, and desire to secure by Letters Patent, is—

In a mold for plastic materials, a supporting-frame, a mold-box open upon one side, a removable side therefor, a rocker extension attached to the mold-box, a track upon which the rocker extension may travel, and a platform for receiving the removable side and the contained block when the mold-box is reversed and withdrawn.

In testimony whereof I have hereunto set my hand in presence of two subscribing witnesses.

ARTHUR W. MASON.

Witnesses:
  A. C. DENISON,
  CLARA G. HAMILTON.